Jan. 27, 1925.  1,524,453
J. E. PERRAULT
APPARATUS FOR WRAPPING UNCURED TUBES FROM CURED TUBES
Filed Aug. 22, 1923
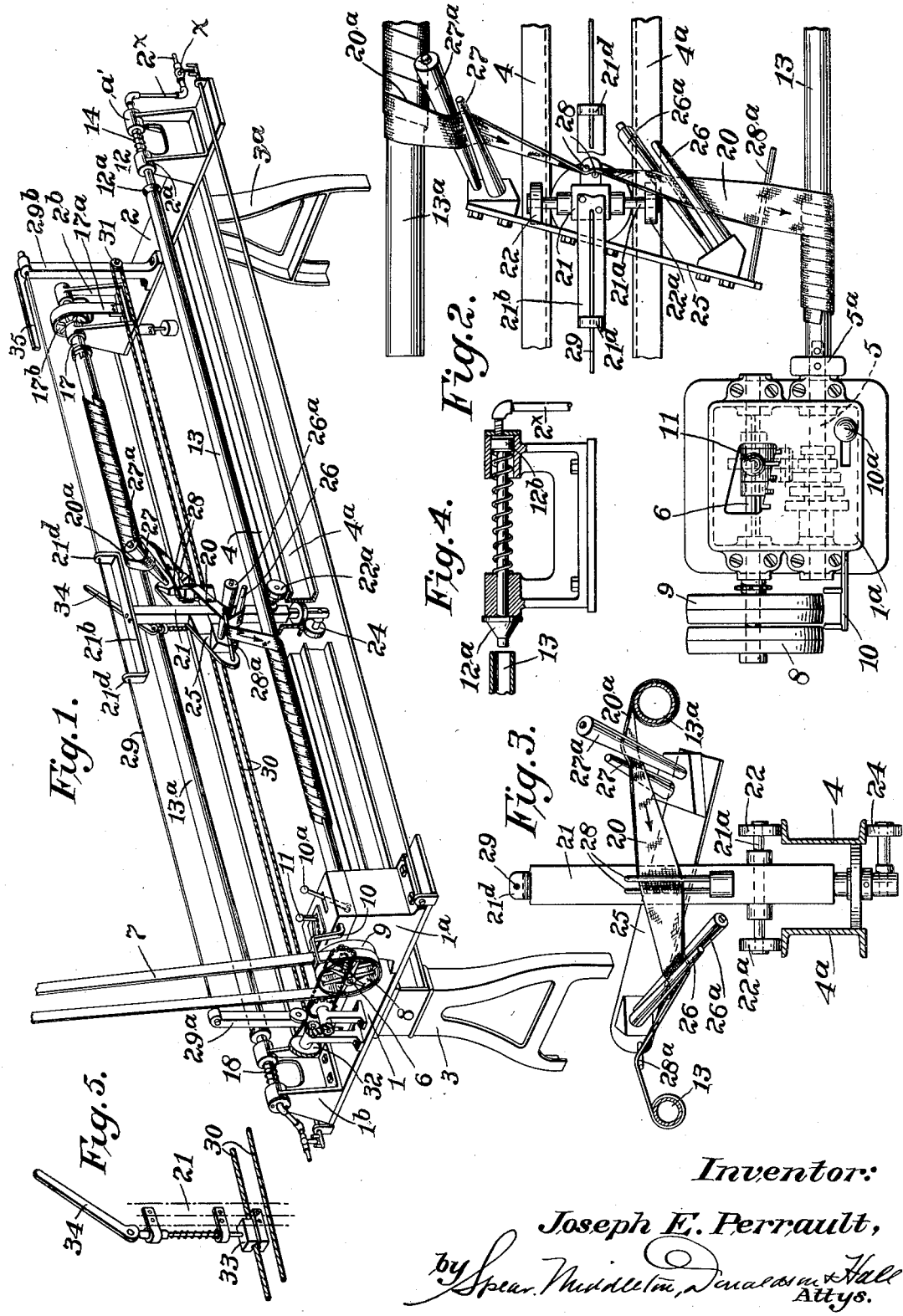
Inventor:
Joseph E. Perrault,
by Spear, Middleton, Donaldson & Hall
Attys.

Patented Jan. 27, 1925.

1,524,453

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

APPARATUS FOR WRAPPING UNCURED TUBES FROM CURED TUBES.

Application filed August 22, 1923. Serial No. 658,824.

*To all whom it may concern:*

Be it known that I, JOSEPH E. PERRAULT, a citizen of the United States, and resident of Watertown, in the county of Middlesex and State of Massachusetts, have invented certain new and useful Improvements in Apparatus for Wrapping Uncured Tubes from Cured Tubes, of which the following is a specification.

My present invention relates to improvements in apparatus for use in the manufacture of tubular articles of rubber compound, such for example, as inner tubes for pneumatic tires, and more particularly to apparatus for wrapping the unvulcanized tube while on its carrying pole or mandrel, with what is termed a rag wrapping, it being customary to encompass the uncured tube with a helically wound and overlapped fabric tape or strip which remains thereon during the vulcanization of the tube and which is thereafter removed therefrom.

The invention aims to provide a simple, durable and efficient form of apparatus which will unwind the strip from the cured tube and simultaneously wind it directly on the uncured tube and which will reverse the strip during such action, whereby one and the same edge will always constitute the outside or overlapping edge.

With these and other objects in view, the invention includes the novel features of construction and arrangement and combination of parts hereinafter described, the nature and scope of my said invention being particularly defined by the appended claims.

An embodiment of my invention is illustrated in the accompanying drawings, in which:—

Figure 1 is a perspective view of apparatus constructed in accordance with my invention.

Fig. 2 is a plan view of details.

Fig. 3 is a view looking from the right of Fig. 2.

Fig. 4 is a sectional view of one of the mandrel clamps.

Fig. 5 is a detail view of the clamp.

Referring by reference characters to this drawing, the numerals 1 and 2 designate end frame members mounted upon a suitable support comprising end standards 3, $3^a$, and longitudinal bars 4, $4^a$. These end frame members carry bearing brackets $1^a$, $1^b$ and $2^a$, $2^b$ respectively, such brackets being preferably of divided form, or in spaced pairs as shown.

Bearing box $1^a$ has journaled therein a shaft 5 with a suitable mandrel chuck $5^a$, and also with suitable driving means. In the present instance, bearing box $1^a$ constitutes a variable gear box by means of which the shaft 5 may be driven at any one of a number of desired speeds from shaft 6 which in turn is driven from any suitable source of power and by any suitable means, as by belt 7 cooperating with fast and loose pulleys 8 and 9 and controlled by belt shipper 10 operated by handle $10^a$. The variable speed gearing may be of any desired type controlled by a suitable handle 11, and as such gearing, per se, forms no part of the present invention, it is shown in a conventional manner only.

A shaft 12 mounted in the corresponding bearings $2^a$ so as to be capable of rotary and rectilinear movement therein, carries at its inner end a mandrel engaging chuck $12^a$ for engaging the opposite end of the tube or mandrel designated 13.

The outer bearing, specifically $a'$, is formed in the shape of an air cylinder and the shaft 12 is provided with a piston head $12^b$ rotatably and slidably filling the cylinder.

A helical spring 14 encircling the shaft between bearing $2^a$ and the piston head, serves normally to hold the shaft pressed towards the right in the position shown in Fig. 4, with the chuck in mandrel-releasing position. Compressed air or other fluid may be admitted to the cylinder by pipe $2^x$ leading to any suitable source of fluid pressure (not shown) and controlled by a three-way cock $x$ which in one position admits compressed air to the cylinder to force the chuck $12^a$ to the left to cause it to cooperate with chuck $5^a$ to clamp the mandrel, and in the other position permits exhaust to atmosphere to release the mandrel from the chucks. In a similar manner the bearing brackets $1^b$ and $2^b$ carry chuck shafts 17 and 18, one of which (for example 17) is provided with friction retarding means, as for example, brake band $17^a$ cooperating with drum $17^b$, while the other is slidable as well as rotatable, and designed to be moved to mandrel clamping position by compressed air against spring pressure, similar to shaft 12 heretofore described. Neither of shafts 17 and 18, however, is provided with any driving means, these being designed to rotatably support the mandrel carrying the tube which has been vulcanized, which is designated 13$^a$, and from which the wrapping strip is to be unwound or removed, such strip being designated 20. It will be observed that in the position in which the strip is wound on the tube or mandrel 13$^a$, the edge 20$^a$ of the fabric strip or tape is the overlapping edge. In order that the strip may be drawn from the vulcanized tube of mandrel 13$^a$ and wound directly on the unvulcanized tube or mandrel 13 with the same edge overlapping or exposed, I provide a turning device comprising a vertical frame member or bar 21 provided at its lower end with supporting rollers for engaging the longitudinal bars which are designed to constitute a track or guide-way. Preferably the bar 21 is provided with a transverse shaft 21$^a$, which carries supporting rollers 22, 22$^a$ resting upon the top of the rails 4, 4$^a$, while a downward extension of bar 21 carries a transverse guide or steadying member 23 cooperating with the opposed inner faces of the bars 4, 4$^a$. Preferably also the extension has a laterally projecting bracket or arm which carries a roller 24 bearing against the under side of one of the rails (4), to act as a holddown. A cross member 25 carried by the standard or bar 21, has its ends provided with two pairs of guide rollers located respectively in proximity to the mandrels 13 and 13$^a$, and designated respectively 26, 26$^a$ and 27, 27$^a$. The rollers of each pair are made of reverse taper, or in the shape of reversely arranged truncated cones, the purpose of which is to keep the strip 20 from wrinkling as it is drawn from the tube or mandrel 13$^a$ to the tube or mandrel 13. The strip tends to move towards the largest diameter of each cone and the consequent action is to keep the edges pulled sidewise in opposite directions and the strip unwrinkled. Between the two sides of the guide cones or rollers is a pair of middle vertical guides 28, the edges of which overlap slightly so that the strip, in passing between them, touches both of them, this having the further action of preventing the stock from wrinkling, and also serving as guiding edges for applying the strip to the tube on the winding mandrel 13 with an even lap. Just after leaving the second set of guide rolls 26, 26$^a$, the strip passes over a guide pin or member 28$^a$, which is arranged approximately parallel to the tube or mandrel, and which gives the strip a final straightening effect just before it is wound on the uncured tube.

I find it desirable to provide additional steadying or guiding means for the supporting carriage, which preferably takes the form of a wire or cable 29 stretched taut between uprights 29$^a$ and 29$^b$, which cable passes through eyes or openings in the ears or lugs 21$^d$ of the longitudinally disposed bar or member 21$^b$ carried at the upper end of the upright 21.

Means are provided for moving the carriage along the guide rails in synchronism with the rotation of the mandrels and such means preferably takes the form of an endless cable 30 passing over an idle roll 31 at one end of the machine, and over a drive pulley 32 at the opposite end, which is driven by suitable gearing from the shaft 6. By driving the cable 30 from the shaft 6 the speed of travel of the carriage and guide rollers remains constant irrespective of the speed at which the mandrel 13 is driven, for the purpose explained below. Suitable means are provided for coupling the carriage to the propelling cable 30, which may conveniently take the form of a cable grip 33 operated by a handle 34 which is released when the carriage reaches the end of its travel by the contact bar or stop member 35.

In the operation of the machine a mandrel carrying a wrapped cured tube is applied in the position indicated at 13$^a$ and the wrapping strip 20 is lead through the guide rolls and applied to the uncured tube on the mandrel held in the position indicated at 13. Thereafter the machine is started and the strip is automatically unwound from the tube or mandrel 13$^a$ and wound up on mandrel 13, being reversed during its travel and smoothly laid on the fresh tube with the same edge overlapping. The winding mandrel 13 is driven through changed feed mechanism, before referred to, at the desired rate of speed, depending on the size of tube to be wrapped, the gears being so arranged that the number of rotations per minute of the poles varies inversely as their diameters, whereby the same peripheral speed, and therefore, the same strip speed, is maintained for every sized pole. The effect of this combination, to wit, of carriage or turning devices traveling at a constant speed and different sizes of mandrels driven at the same surface speed, is to give the same number of feet of strip on each wrapped tube, a small tube having a narrower lap than a larger one.

Having thus described my invention, what I claim is:—

1. A wrapping machine of the type described, having a plurality of mandrel supports for sustaining cylindrical mandrels in parallelism, in combination with tape turning mechanism supported by said machine, and means driven from a moving part of the machine for moving said tape turning mechanism.

2. A wrapping machine of the type described, having a plurality of mandrel supports for sustaining cylindrical mandrels in parallelism, tape turning mechanism, longitudinal guides for said turning mechanism, an endless cable disposed parallel with said guides, and means for connecting said turning device to said endless cable.

3. A wrapping machine of the type described, having a plurality of mandrel supports for sustaining cylindrical mandrels in parallelism, tape turning mechanism, longitudinal guides for said turning mechanism, an endless cable disposed parallel with said guides, a cable grip carried by said turning mechanism, and means for automatically releasing said cable grip.

4. A machine of the class described, comprising mandrel supports for sustaining a pair of cylindrical mandrels in parallelism, a pair of guides parallel thereto, a traverse device slidably supported by said guides, tape turning means on said traverse device comprising two sets of reverse cone shaped rollers, and means operated from a moving part of the machine for moving said traverse device.

5. A machine of the class described comprising mandrel supports for sustaining a pair of cylindrical mandrels in parallelism, a guide parallel thereto, a traverse device slidably supported by said guide, strip turning means comprising two pairs of reverse cone shaped rollers carried by said traverse device, and means for driving one of said mandrels.

6. A wrapping machine of the type described, having a plurality of mandrel supports for sustaining cylindrical mandrels in parallelism, means for driving one of said mandrels at different rates of speed, tape turning mechanism supported by said machine, and means for moving said tape turning mechanism at a constant speed irrespective of the speed of said driven mandrel.

7. A wrapping machine of the type described, having a pair of mandrel supports for sustaining cylindrical mandrels in parallelism, means for driving one of said mandrels at different rates of speed, friction means for retarding the rotation of the other mandrel, tape turning mechanism, and means for driving said tape turning mechanism at uniform speed irrespective of the speed of the driven mandrel.

In testimony whereof, I affix my signature.

JOSEPH E. PERRAULT.